United States Patent
Roeckle

(10) Patent No.: US 9,463,472 B2
(45) Date of Patent: Oct. 11, 2016

(54) FEED CHANNEL COMPRISING AN EXPANSION BODY FOR CHARGING THE SEPARATOR ELECTRODE OF A WET OVERSPRAY SEPARATOR DEVICE

(71) Applicant: Eisenmann SE, Boeblingen (DE)

(72) Inventor: Juergen Roeckle, Magstadt (DE)

(73) Assignee: EISENMANN SE, Boeblingen (DE)

( * ) Notice: Subject to any disclaimer, the term of this patent is extended or adjusted under 35 U.S.C. 154(b) by 0 days.

(21) Appl. No.: 14/648,819

(22) PCT Filed: Nov. 15, 2013

(86) PCT No.: PCT/EP2013/003449
§ 371 (c)(1),
(2) Date: Jun. 1, 2015

(87) PCT Pub. No.: WO2014/082712
PCT Pub. Date: Jun. 5, 2014

(65) Prior Publication Data
US 2015/0298141 A1 Oct. 22, 2015

(30) Foreign Application Priority Data
Dec. 1, 2012 (DE) ........................ 10 2012 023 554

(51) Int. Cl.
*B01D 53/02* (2006.01)
*B03C 3/16* (2006.01)
*B05B 15/12* (2006.01)
(Continued)

(52) U.S. Cl.
CPC . *B03C 3/16* (2013.01); *B03C 3/34* (2013.01); *B03C 3/53* (2013.01); *B05B 15/1244* (2013.01); *Y02P 70/36* (2015.11)

(58) Field of Classification Search
CPC ............. B03C 3/16; B03C 3/34; B03C 3/53; B05B 15/1244; Y02P 70/36
See application file for complete search history.

(56) References Cited

U.S. PATENT DOCUMENTS

| 3,742,681 | A |   | 7/1973 | DeSeversky |
| 4,544,382 | A | * | 10/1985 | Taillet ........................ B03C 3/12 361/230 |
| 4,745,709 | A |   | 5/1988 | Johnson |

(Continued)

FOREIGN PATENT DOCUMENTS

| DE | 10 2008 046 414 A1 | 3/2010 |
| DE | 10 2010 007 479 B3 | 6/2011 |

(Continued)

*Primary Examiner* — Christopher P Jones
(74) *Attorney, Agent, or Firm* — Factor Intellectual Property Law Group, Ltd.

(57) ABSTRACT

A separator unit having a panel-shaped separator electrode on which at least one separator surface is formed for the overspray. A feed device ensures that a separator liquid can be fed to the separator surface of the separator electrode. It has a channel that can be filled with the separator liquid, and a removal device which can remove separator liquid from the channel. The latter includes a shape-changing, flexible and/or elastic expansion element arranged in the channel, which at least partially delimits a closed cavity. The removal device includes a pump device with which a pressure medium can be pushed into the closed cavity. As a result of the volume expansion of the closed cavity when "pumping up" said expansion element, separator liquid is displaced over the edges of the channel and from here it can be conducted onto the separator surface of the separator electrode in a suitable manner.

12 Claims, 6 Drawing Sheets

(51) Int. Cl.
*B03C 3/53* (2006.01)
*B03C 3/34* (2006.01)

(56) References Cited

U.S. PATENT DOCUMENTS

| | | | |
|---|---|---|---|
| 5,160,510 A | 11/1992 | Steinbacher et al. | |
| 6,582,500 B1 * | 6/2003 | Ohadi | B03C 3/16 55/DIG. 38 |
| 8,945,288 B2 | 2/2015 | Swoboda et al. | |
| 2003/0200869 A1 | 10/2003 | Brock | |
| 2009/0114092 A1 | 5/2009 | Bengtsson et al. | |
| 2011/0100212 A1 | 5/2011 | Oonk | |
| 2011/0168550 A1 * | 7/2011 | Wang | H01M 4/13 204/290.12 |
| 2011/0203459 A1 * | 8/2011 | Swoboda | B03C 3/08 96/62 |
| 2012/0304925 A1 * | 12/2012 | Link | B03C 3/08 118/620 |
| 2013/0032088 A1 * | 2/2013 | Schulze | B03C 3/017 118/620 |
| 2014/0202332 A1 * | 7/2014 | Link | B05B 15/1248 95/267 |

FOREIGN PATENT DOCUMENTS

| | | |
|---|---|---|
| EP | 1 460 198 A1 | 9/2004 |
| FR | 2 314 766 | 1/1977 |
| GB | 1 600 232 | 10/1981 |
| GB | 2 142 386 A | 1/1985 |
| GB | 2 183 737 A | 6/1987 |
| WO | 2007140882 A1 | 12/2007 |

* cited by examiner

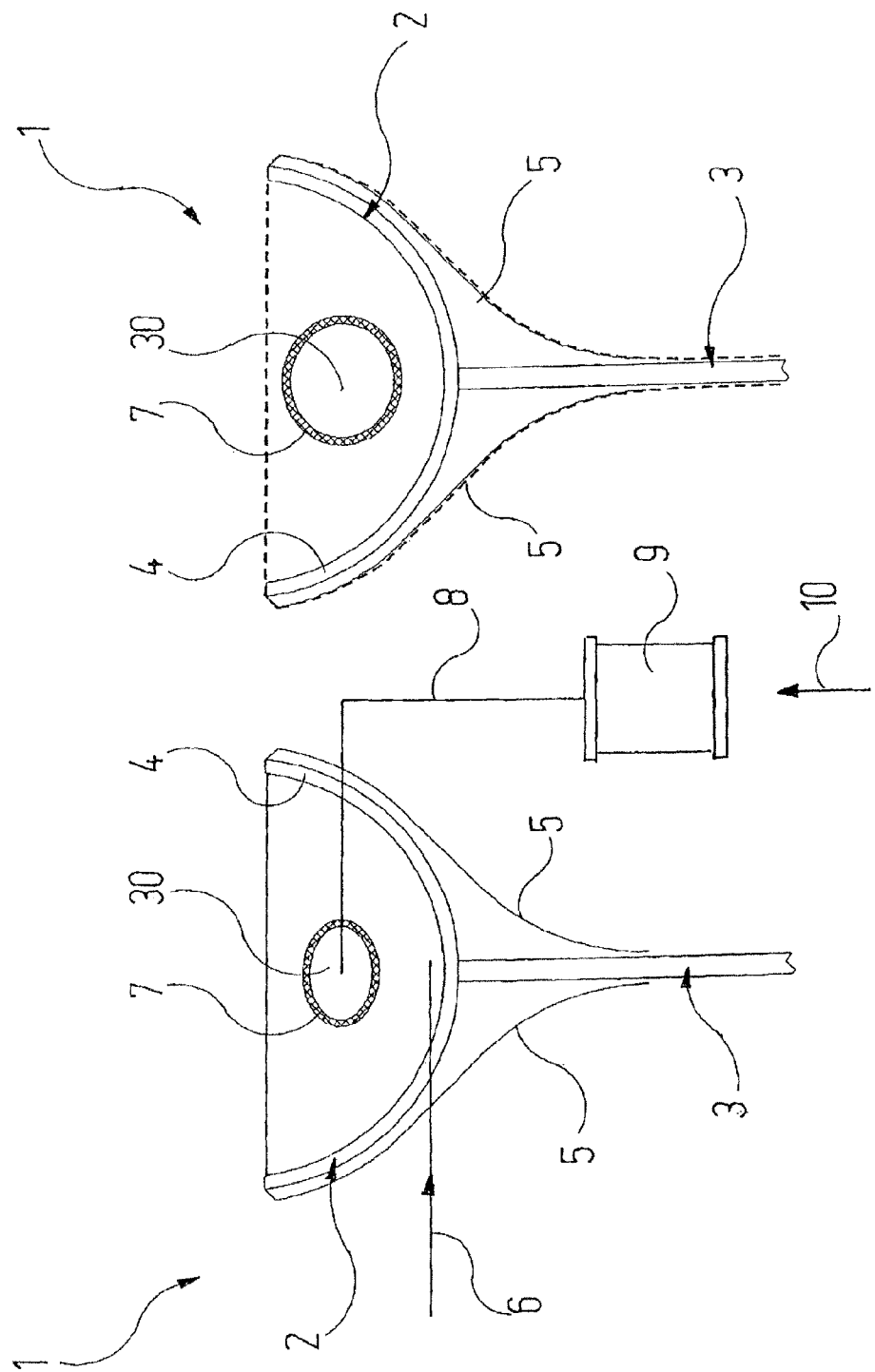

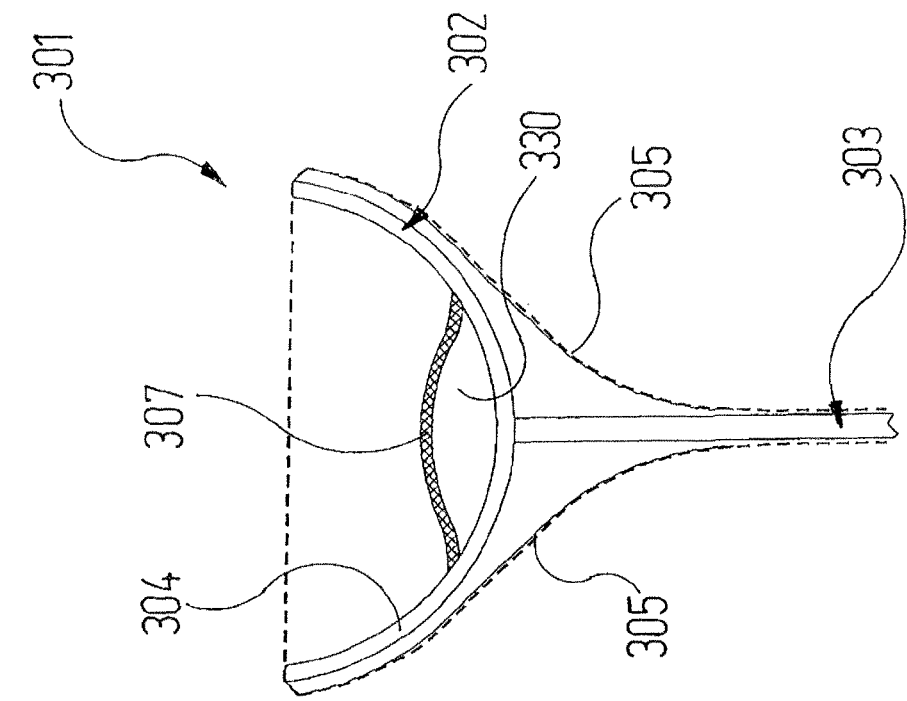
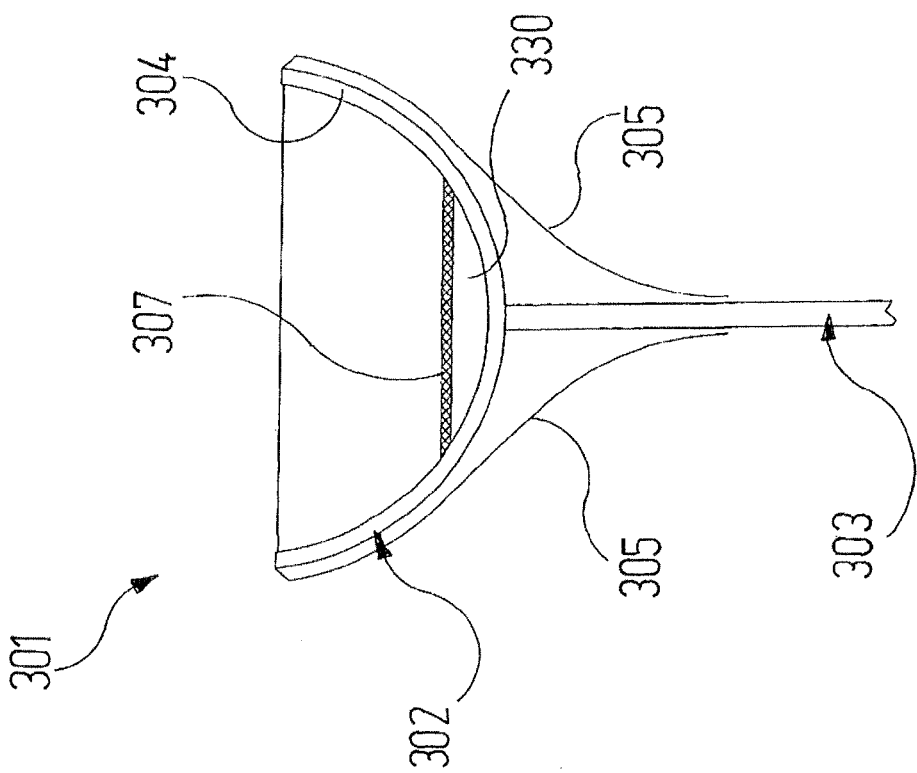

FEED CHANNEL COMPRISING AN EXPANSION BODY FOR CHARGING THE SEPARATOR ELECTRODE OF A WET OVERSPRAY SEPARATOR DEVICE

RELATED APPLICATIONS

This application is a national phase of International Patent Application No. PCT/EP2013/003449, filed Nov. 15, 2013, which claims the filing benefit of German Patent Application No. 10 2012 023 554.2, filed Dec. 1, 2012, the contents of both of which are incorporated herein by reference.

FIELD OF THE INVENTION

The invention relates to a separator unit for use in a separator device for overspray in an installation for coating objects, with
a) a panel-shaped separator electrode, on which at least one separator surface is formed for the overspray;
b) a feed device, with which separator liquid can be fed to the separator surface of the separator electrode and which comprises:
 ba) a channel, which can be filled with the separator liquid;
 bb) a removal device, with which separator liquid can be removed from the channel.

BACKGROUND OF THE INVENTION

The previously common wet separators, which were used for the separation of overspray in coating installations, in particular in car body paint shops, are increasingly being replaced, for known reasons that will not be repeated in greater detail here, by electrostatic separator devices such as are described in DE 10 2008 046 414 A1 or also DE 10 2010 007 479 B3, for example. Separator devices of this kind comprise a plurality of separator units, the main component of which in each case is at least one panel-shaped separator electrode. These separator electrodes are arranged at intervals from one another in the separator device, substantially parallel to one another. Located respectively between adjacent separator electrodes is a high-voltage electrode. The application of a high voltage to the high-voltage electrode causes an electrical field to be created between this and the separator electrodes. If cabin air charged with overspray is routed between the separator electrodes, the overspray particles are initially ionised and then guided by the electrical field onto the separator surfaces of the separator electrodes, where they precipitate.

The problem arises here of how the precipitate consisting of overspray is removed to keep the separator surfaces permanently free. Various mechanical systems were used previously for this purpose, which will not be considered in greater detail here. An especially reliable method of removing the overspray precipitate from the separator electrodes consists in permitting a separator liquid to flow in a closed film over the separator surfaces. The overspray particles are taken up in the separator liquid and flow with the separator liquid into a collection vessel, for example. In favourable cases, the overspray can be recovered from the separator liquid collected.

To achieve the desired effect, it is important that the separator liquid flows uniformly and completely over the separator surfaces, so that no areas of the separator surface thus remain free of separator liquid. To do this, an overflow channel is used in DE 10 2008 046 414 A1, already mentioned above, which describes a separator unit of the type stated at the beginning. The overflow channel extends at a height lying above the upper edge of the separator electrode, and is supplied in a suitable manner with a separator liquid. This separator liquid is removed from the channel and then routed to the separator surfaces of the separator electrode in a suitable manner.

DE 10 2008 046 414 A1 describes substantially two possibilities for how the removal of the separator liquid can take place from the channel: firstly the channel is operated as an overflow channel, in which the channel simply overflows its upper edges with an adequate feed of separator liquid. As the second possibility, rolls are described that are arranged with their longitudinal axes in parallel in such a way that they are partially immersed in the separator liquid located in the overflow channel. Upon their rotation, they scoop and carry separator liquid, which is removed from them again at another point by doctor-blade-like devices and is then fed to the separator surfaces of the separator electrodes.

"Active" removal of the separator liquid is basically preferable to "passive" removal due to pure overflow. However, the rotating rolls mentioned above have the disadvantage that their scooping ability, thus the ability to remove separator liquid from the channel upon their rotation, is dependent on material properties of the separator liquid, in particular on its viscosity.

SUMMARY OF THE INVENTION

An object of the present invention is to create a separator unit of the type named at the beginning in which the separator liquid can be removed from the channel with a precise scooping capacity that is very largely independent of material properties.

This object may be achieved according to the invention in that
c) the removal device comprises:
 ca) at least one shape-changing, flexible and/or elastic expansion element arranged in the channel, which element at least partially delimits a closed cavity;
 cb) a pump device, with which a pressure medium can be pushed into the closed cavity.

According to the invention, by "pumping up" the cavity that is at least partially delimited by the expansion element, liquid is pushed actively and positively out of the channel into overflow, wherein the quantity pushed out depends exclusively on the change in volume of the closed cavity and not on material properties of the separator liquid. Dynamic seals, such as become necessary when using pistons, for example, are not present, which reduces the maintenance requirement decisively.

The expansion element can be a shape-changing, flexible and/or elastic tube, which is arranged in the channel and is immersed at least partially, preferably completely, in the separator liquid located in the channel in the operational state.

The expansion element can also be an elastic membrane, however, which is connected tightly at its edges to the interior wall of the channel.

A particularly preferred embodiment of the invention is characterised in that the closed cavity, the pump device and a storage device as well as the connecting lines form a closed system in which a defined volume of the pressure medium can be moved back and forth. For long-term operation of the separator unit according to the invention that is configured in this way, therefore, only a small quantity of the pressure medium is required; slight losses must at most be replaced after a certain operating period.

It is structurally favourable if the pump device and the storage device are combined in a structurally integrated manner in a bellows-like pump and storage device. To push the separator liquid out, this bellows-like pump and storage device must be acted upon by a force; if this force is removed or reversed, the pump and storage device sucks the pressure medium back out of the closed cavity again.

It is naturally also possible, however, that the pump device is realised by a bidirectional pump, which lies in the flow path between the closed cavity and the storage device.

The pressure medium can be a gas, for example, in particular air, or water.

A separator unit in which the interior of the channel is divided into at least two partial chambers by at least one partition wall, wherein an expansion element is provided in each partial chamber, to which element a dedicated pump device is assigned, operates especially variably and precisely. In this way different quantities of the separator liquid can be supplied to the different partial chambers per unit of time, so that different thicknesses of the liquid film occur on different areas of the separator surface.

It is also expedient if compressed air can be introduced into the closed cavity to detect leaks.

To detect leaks from which pressure medium is escaping, a pressure sensor can be arranged in a line carrying the pressure medium, which sensor generates a fault signal if the pressure falls below a limit value.

If air is used as the pressure medium, in order to detect leaks in which separator liquid enters the air system, a liquid trap can be provided in a line carrying the air, in which trap a liquid sensor is arranged, which produces a fault signal when liquid emerges and increases the pressure of the air. The location of the leaks can then be detected by the air bubbles rising in the separator liquid.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Embodiments of the invention are explained in greater detail below with reference to the drawing, in which FIG. 1a shows a first embodiment of a separator unit in the standby state in section perpendicular to its longitudinal direction;

FIG. 1b shows the separator unit in FIG. 1a in a functional state;

FIG. 4a shows a fourth embodiment of a separator unit in the standby state;

FIG. 4b shows the separator unit in FIG. 4a in a functional state;

DETAILED DESCRIPTION OF THE PRESENT INVENTION

Figures 2A, 2B:
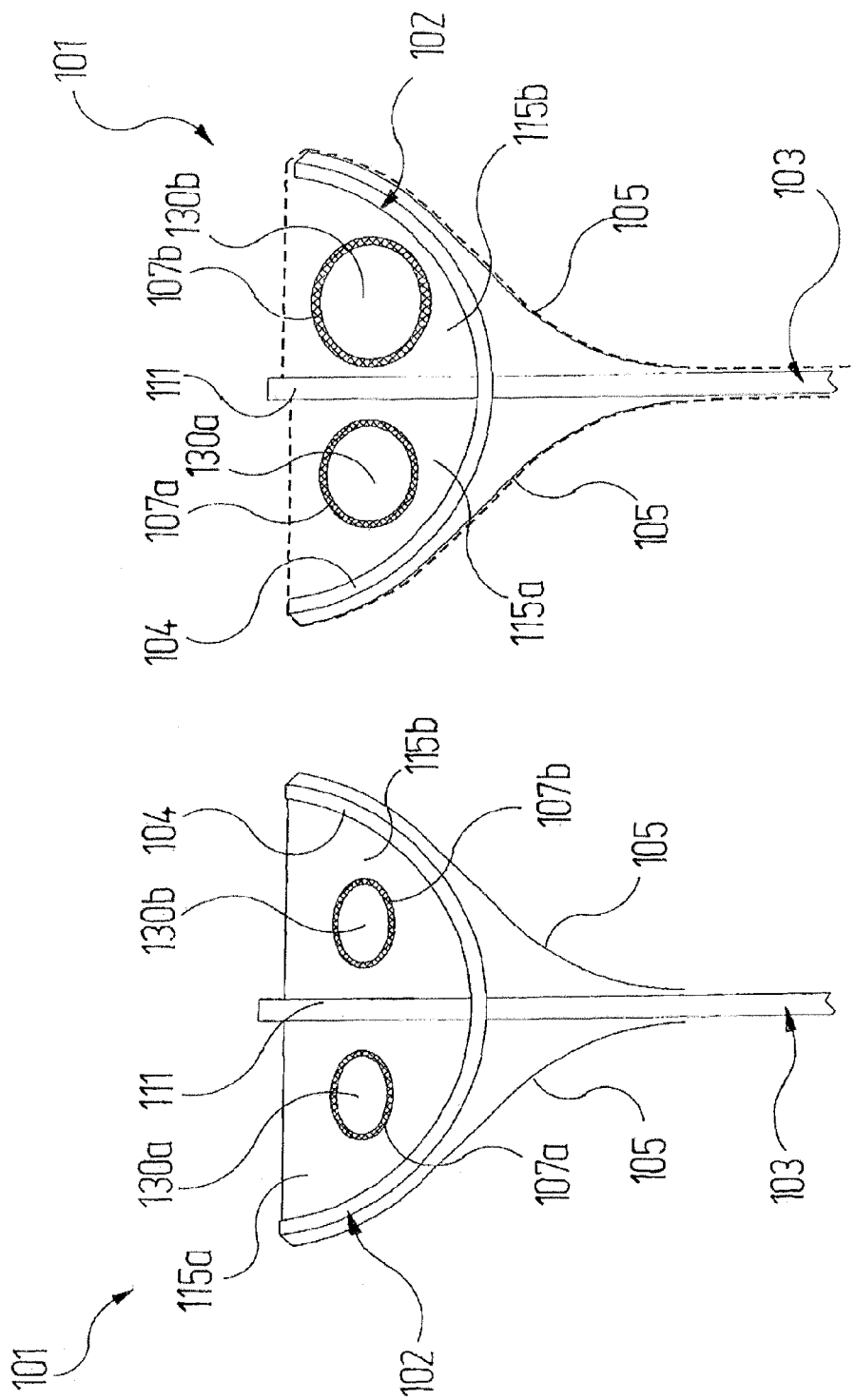
FIG. 2a shows a second embodiment of a separator unit in a standby state.
FIG. 2b shows the separator unit in FIG. 2a in a functional state.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Reference is made first to FIGS. 1a and 1b. Shown there is a separator unit, which is identified as a whole by the reference sign 1 and is known in its relevant main features in the present context from the publications DE 10 2010 007 479 B3, in particular FIG. 4 of this, and DE 10 2008 046 414 A1, which publications were mentioned at the beginning. The representation of the separator unit 1 in FIGS. 1a and 1b is "slimmed down" to the necessary functional components, thus does not contain many details of the known separator units, although the latter could be provided in principle with these details. The environment in which the separator unit 1 is used, namely in a separator device, which removes the inevitable overspray from the installation air in paint shops, is described in greater detail in the said two printed publications. Reference may be made to these.

In this context it is enough to know that several of the illustrated separator units 1 are arranged adjacent to one another in the separator device and a high-voltage electrode is placed respectively between adjacent separator units 1. The air to be cleaned is routed between the separator units 1. The overspray is moved in an electrical field, which is built up between the high-voltage electrodes and the separator units 1, towards the separator units 1, where it is precipitated.

The separator unit 1 comprises two main components, namely a feed device for a separator liquid, which has the reference sign 2 as a whole, and a panel-shaped separator electrode 3, which has a separator surface for the overspray on opposing sides in each case. At its upper edge the separator electrode 3 bears an overflow channel 4, which is roughly semicircular in shape in cross section and is part of the feed device 2. Attached to the upper longitudinal edges of the overflow channel 4 are two spring sheets 5 curved in the shape of a flat S, which follow the outer contour of the overflow channel 4 in the upper region, curve downwards in the opposite direction and lie with their lower edges more or less tight on the separator surfaces of the separator electrode 3.

The interior of the overflow channel 4 can be filled via a line 6 with a separator liquid, the function and nature of which are described in greater detail in the aforesaid printed publications. In the standby state shown in FIG. 1a, the separator liquid fills the overflow channel 4 up to its top edge.

Located in the overflow channel 4 below the liquid level of the separator liquid is an expansion element 7 in the form of an elastic tube, which extends over the entire length of the overflow channel 4 and thus of the separator unit 1. The interior of the expansion element 7 is connected via a line 8 to a pump and storage device 9 configured in the manner of a bellows. The interior of the expansion element 7, the line 8 and the interior of the pump and storage device 9 form a closed system in which a pressure medium, for example air, can be moved back and forth.

The mode of operation of the described separator unit 1 is as follows:

In the standby state shown in FIG. 1a, in which the separator unit 1 is prepared ready for operation, the overflow channel 4 is filled via the line 6 with the separator liquid up to the edge. The expansion element 7 assumes its smallest possible volume. The majority of the pressure medium is located in this case in the pump and storage device 9. If the separator device is now turned on by applying high voltage to the high-voltage electrodes lying between adjacent separator units 1 and conducting air between adjacent separator units 1 and the electrodes, the opposing separator surfaces of the panel-shaped separator electrode 3 must be covered with a film of separator liquid as completely as possible. This is achieved by acting upon the pump and storage device 9 with force in the direction of the arrow 10 in FIG. 1a, due to which its interior is made smaller and pressure medium is pushed out of the interior via the line 8 into the interior 30 of the expansion element 7. This expands, as shown in FIG. 1b. FIG. 1b and FIGS. 2a, 2b, 3, 4a, 4b and 5 do not show the line 8 and the pump and storage device 9 for illustration reasons, although they are generally present in the same manner.

Due to the increase in volume of the expansion element 7, separator liquid is displaced from the overflow channel 4, so that it overflows the upper edges of the overflow channel 4, passes from there to the outer surfaces of the spring sheets 5 and from there in turn to the separator surfaces of the separator electrode 3, as is shown by dotted lines in FIG. 1b. This process of displacement of the separator liquid from the overflow channel 4 continues until the expansion element 7 has attained its maximum possible volume, thus a state in which the pump and storage device 9 is very largely empty.

The external force exerted on the pump and storage device 9 is removed or reversed. On account of the bellows-like character of this device, this is elongated again and sucks pressure medium back out of the interior 30 of the expansion element 7 via the line 8. The volume of this is reduced once more until finally the state in FIG. 1a is reached again. Separator liquid is topped up in the overflow channel 4 via the line 6 so that a new cycle in the operation of the separator unit 1 can commence.

The pressure/suction change takes place in a pulsed manner at short intervals, so that the separator surfaces are moistened quasi-continuously. Due to this pulsing, a type of "wave" can be generated in the channel, which ensures a uniform exit of the separator liquid in spite of any adjustment deficits in the channel. Any remaining unevenness in the flow of the separator liquid is balanced out up to reaching the separator surfaces.

A second embodiment of a separator unit is shown in FIGS. 2a and 2b, which unit very largely corresponds to the separator unit 1 described with reference to FIGS. 1a and 1b above in its function. Parts that perform a comparable function are identified by the same reference sign plus 100. This also applies in principle to the embodiments described further below with reference to FIGS. 3 to 5, in which the reference signs are increased by 100 respectively compared with the embodiment described immediately before.

The main difference in the separator unit 101 in FIGS. 2a and 2b consists in the fact that the interior of the overflow channel 104 is divided by a central bulkhead 111 into two partial chambers 115a, 115b. Each of these partial chambers 115a, 115b contains an expansion element 107a, 107b and assigned to each of the expansion elements 107a, 107b is a dedicated pump and storage device, which is not shown in the drawing, however.

The purpose of this arrangement is that separator liquid can be discharged to a different extent from the overflow channel 104 on opposing longitudinal edges. The two expansion elements 107a, 107b are "pumped up" to this end by the assigned pump and storage devices to a different extent, as shown in FIG. 2b. In the embodiment shown, greater quantities of the separator liquid are displaced from the right-hand partial chamber 115b of the overflow channel 104 by expanding the expansion element 107b there faster than the left-hand expansion element 107a. The result is that a thicker film of separator liquid is created on the right-hand separator surface of the separator electrode 103 in FIGS. 2a and 2b than on the left-hand side.

Figure 3:
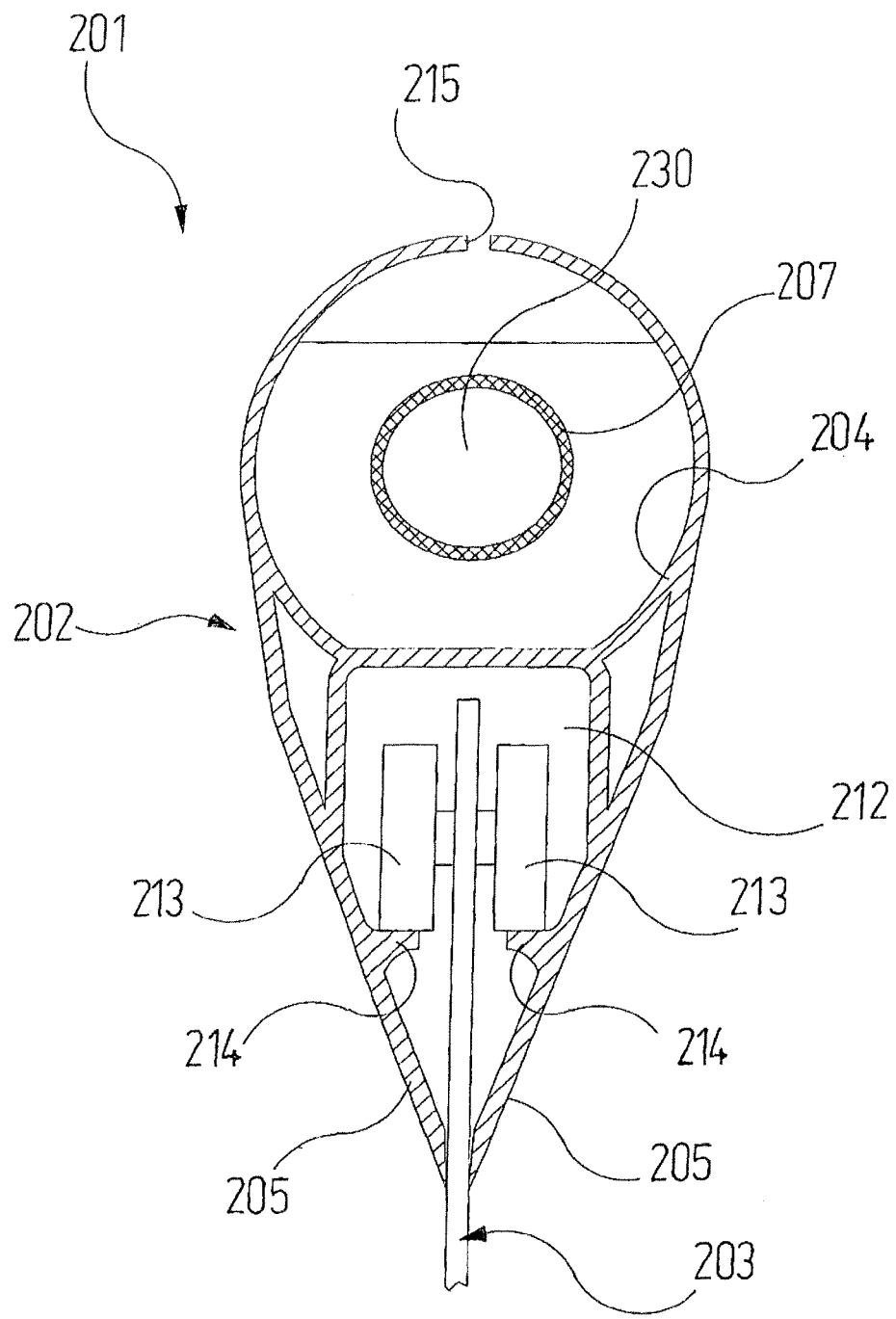
FIG. 3 shows a third embodiment of a separator unit in the standby state.

The embodiment of a separator unit 201 shown in FIG. 3 is also closely related in function to the two embodiments described above. What is different is as follows:

The overflow channel 204 is formed in an extruded profile, for example of steel or of plastic, which, connected in one piece to the overflow channel 204, has two conducting elements 205 that converge downwards, which replace the spring sheets 5 of the embodiment in FIGS. 1a, 1b. Apart from this, a cavity 212 is provided running below the overflow channel 204 in the longitudinal direction of the separator unit 201. Attached rotatably in the upper edge area of the separator electrode 203 on opposing sides are several rollers 213, which can roll on two rail-like webs 214 that protrude inwards and are connected to the conducting elements 205. The arrangement is such that the separator electrode 203 can easily be withdrawn from the hollow profile in the direction perpendicular to the drawing level in FIG. 3 if this should become necessary for maintenance or cleaning purposes.

Another difference of the separator unit 201 compared with the separator units 1; 101 in FIGS. 1a, 1b, 2a and 2b is that the overflow channel 204 is shaped in cross section virtually as a closed circle and has only a relatively narrow gap 215 at the upper apex. The separator liquid emerges via this gap 215 when the expansion element 207 is "pumped up". It then flows over the outer surfaces of the overflow channel 204 and the outer surfaces of the conducting elements 205 downwards onto the separator surfaces of the separator electrode 203.

The separator unit 301 in FIGS. 4a and 4b has an especially great similarity to the separator unit 1 in FIGS. 1a and 1b. The only difference here consists in the fact that no closed expansion element is used. Instead of this, a strip-shaped elastic membrane 307 is attached tightly by its edges to the inner shell surface of the overflow channel 304. The closed cavity 330 below the membrane 307 is connected to a pump and storage device, which is not shown, in the manner described above with reference to FIG. 1a.

In the standby state, which is shown in FIG. 4a, the membrane 307 is just tensioned such that it is basically level. The overflow channel 304 is filled with separator liquid up to the edge. If the closed cavity 330 between the membrane 307 and the overflow channel 304 is now put under pressure, the membrane 307 bulges upwards, as can be seen in FIG. 4b, and in so doing displaces the separator liquid over the top edges of the overflow channel 304, from where it passes via the spring sheets 305 downwards onto the separator surfaces of the separator electrode 303.

Figure 5:
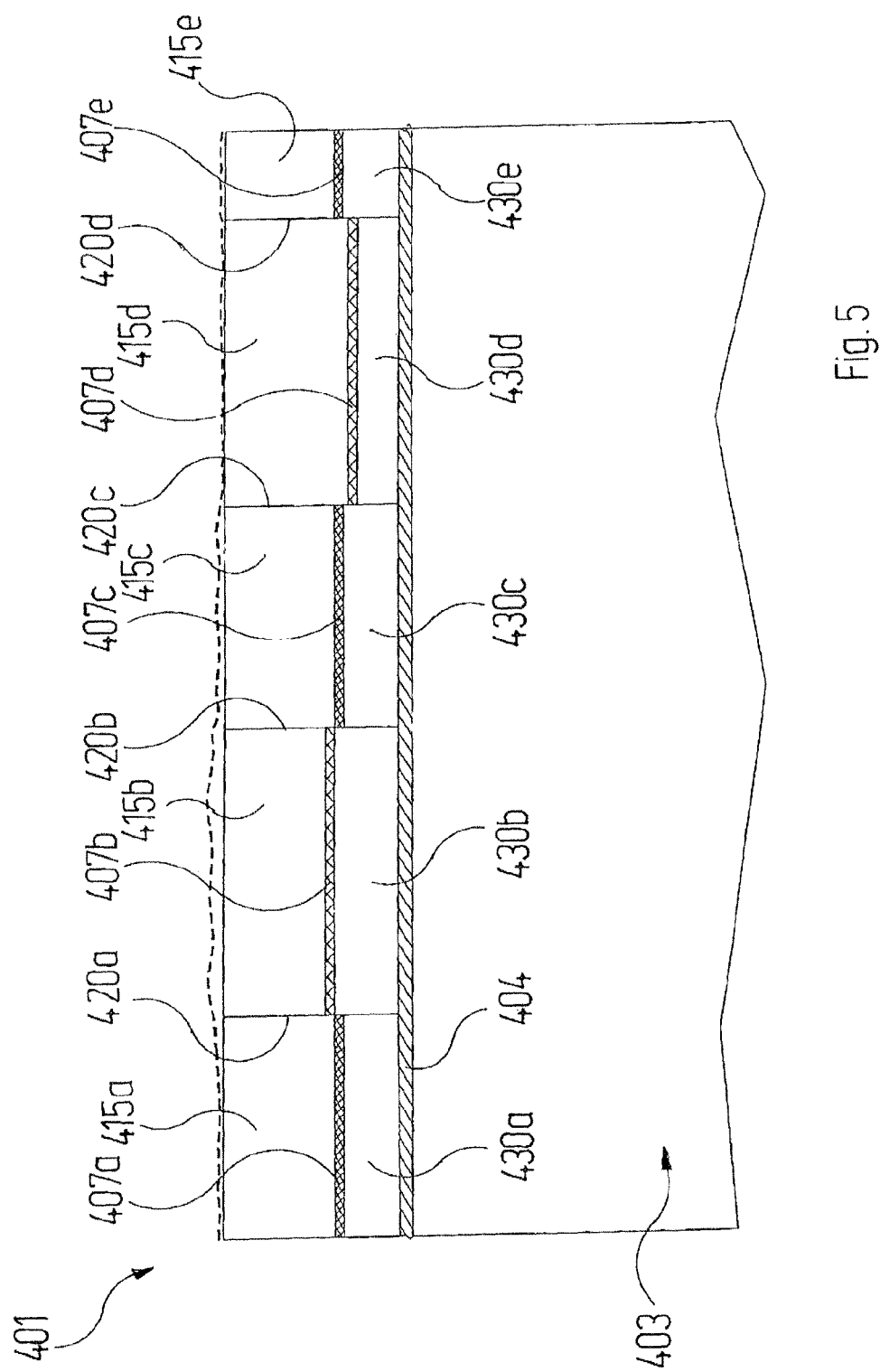
FIG. 5 shows a vertical longitudinal section through a further embodiment of a separator unit.

In the case of the embodiments described above, it was assumed that the overflow channels 4; 104; 204; 304 run over the entire length of the separator unit 1; 101; 201; 301 without further division. However, this can also be configured differently, as shown in FIG. 5. This shows a longitudinal section through a separator unit 401, in which, however, the overflow channel 404 is divided by vertical bulkheads 420a to 420d into five partial chambers 415a to 415e in all. Located in each of these partial chambers 415a to 415b is an elastic membrane 407a to 407e, which corresponds in each case to the membrane 307 in the embodiment in FIGS. 4a and 4b.

The closed cavities 430a to 430e below the membranes 407a to 407e, which are delimited downwards by the overflow channel 404, are each connected to separate pump and storage devices, such as are shown in FIG. 1a, but have been omitted in FIG. 5 for reasons of clarity. It is possible in this way to create areas in the longitudinal direction of the separator unit 401 in which different quantities of separator liquid are displaced per unit of time out of the overflow channel 404, so that the thickness of the film of separator liquid that is set on opposing sides of the separator electrode differs in the longitudinal direction of the separator unit 1.

As mentioned above, the closed cavities 30; 130a, 130b; 230, tube-like expansion elements 7; 107a, 107b; 207 and the closed cavities 330; 430a to 430e partially delimited by the membranes 307 and 407a to 407e with the lines to the corresponding pump and storage devices and the pump and storage devices themselves represent a closed system, in which the pressure medium needs only to be moved back and forth, thus is not subject to any continuous consumption.

Instead of a combined pump and storage device with the nature of a bellows, it goes without saying that a rigid store can also be used, wherein the pressure medium is then moved back and forth between the closed cavity inside the overflow channel and the store by a bidirectional pump.

Figure 6:
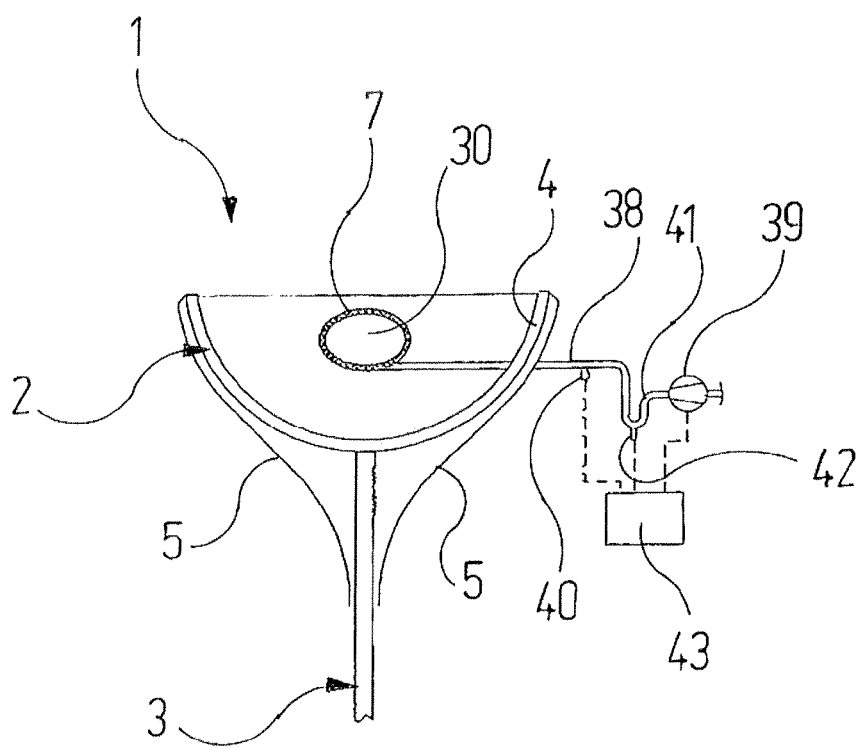
FIG. 6 shows the separator unit in FIGS. 1a and 1b with an air supply and leak detection device.

In FIG. 6 the separator unit 1 in FIGS. 1a and 1b is shown with another system for supplying the pressure medium and additionally with a leak detection device.

Air is used here as a pressure medium, which is aspirated from the environment via a fan 39 and introduced into the closed cavity 30 of the elastic tube 7 via the line 38. Located in the line 38 is a trap 41, at the lowest point of which trap a liquid sensor 42 is mounted, as well as a pressure sensor 40. The liquid sensor 42 and pressure sensor 40 are connected to an electronic control unit 43.

If separator liquid escapes from the channel 4 into the system carrying air due to a leak, it collects in the trap 41 and the moisture sensor 42 transmits a signal to the control unit 43. This triggers a fault signal on the one hand and on the other it increases the pressure with which the fan 39 acts on the cavity 30 in the channel 4. This air enters the separator liquid in the form of bubbles and in this way reveals the location of the leak.

If the system carrying the compressed air has a leak, the pressure sensor 40 detects a drop in the pressure amplitudes. If a minimum pressure is reached, the pressure sensor 40 sends a corresponding signal to the control device 43, which for its part triggers a fault signal.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A separator unit for use in a separator device for overspray in an installation for coating objects comprising:
   a) a panel-shaped separator electrode, on which at least one separator surface is formed for the overspray;
   b) a feed device, with which a separator liquid can be fed to the at least one separator surface of the panel-shaped separator electrode and which comprises:
      ba) a channel, which can be filled with the separator liquid;
      bb) a removal device, with which separator liquid can be removed from the channel;
   wherein
   c) the removal device comprises:
      ca) at least one shape-changing, flexible and/or elastic expansion element arranged in the channel, which element at least partially delimits a closed cavity; and
      cb) a pump device, with which a pressure medium can be pushed into the closed cavity.

2. The separator unit according to claim 1, wherein the at least one shape-changing, flexible and/or expansion element is a shape-changing, flexible and/or elastic tube.

3. The separator unit according to claim 1, wherein the at least one shape-changing, flexible and/or expansion element is an elastic membrane, which is connected tightly at its edges to an interior wall of the channel.

4. The separator unit according to claim 1, wherein the closed cavity, the pump device and a storage device as well as connecting lines form a closed system, in which a defined volume of the pressure medium can be moved back and forth.

5. The separator unit according to claim 4, wherein the pump device and the storage device are combined in a structurally integrated manner in a bellows-like pump and storage device.

6. The separator unit according to claim 4, wherein the pump device is realised by a bidirectional pump, which lies in a flow path between the closed cavity and the storage device.

7. The separator unit according to claim 1, wherein the pressure medium is a gas, in particular air.

8. The separator unit according to claim 1, wherein the pressure medium is water.

9. The separator unit according to claim 1, wherein an interior of the channel is divided by at least one partition wall into at least two partial chambers, wherein an expansion element is provided in each partial chamber, assigned to which element is a dedicated pump device.

10. The separator unit according to claim 1, wherein compressed air can be introduced into the closed cavity to detect leaks.

11. The separator unit according to claim 1, wherein a pressure sensor is arranged in a line carrying the pressure medium, which sensor generates a fault signal if the pressure falls below a limit value.

12. The separator unit according to claim 7, wherein a liquid trap is provided in a line carrying the air, arranged in which trap is a liquid sensor, which generates a fault signal and increases the air pressure if liquid appears.

* * * * *